United States Patent [19]
Park et al.

[11] Patent Number: 5,763,520
[45] Date of Patent: Jun. 9, 1998

[54] POLYPROPYLENE BUMPER COVER COMPOSITION

[75] Inventors: Bong Hyun Park; Jin Soo Kim; Im Suk Kim, all of Kyungsangnam-do, Rep. of Korea

[73] Assignee: Hyundai Motor Company, Seoul, Rep. of Korea

[21] Appl. No.: 691,363

[22] Filed: Aug. 2, 1996

[30] Foreign Application Priority Data

Sep. 6, 1995 [KR] Rep. of Korea .................. 95-29134

[51] Int. Cl.⁶ .................................................. C08L 23/10
[52] U.S. Cl. .................................... 524/451; 525/240
[58] Field of Search ............................. 524/451; 525/240

[56] References Cited

U.S. PATENT DOCUMENTS 5,001,182  3/1991  Maruya et al. ..................... 524/457

*Primary Examiner*—Mark L. Warzel
*Attorney, Agent, or Firm*—Finnegan, Henderson, Farabow, Garrett & Dunner LLP

[57] ABSTRACT

This invention relates to a polypropylene bumper cover composition, particularly to a polypropylene bumper cover composition with improved contraction rate, painting properties, and molding properties. This composition includes 55 to 70 wt % of a polypropylene resin, 28 to 45 wt % of an ethylene-propylene rubber component, 2 to 5 wt % of an inorganic filler, 1 to 2.5 wt % of high density polyethylene, and 2.5 to 7 wt % of oxidation inhibitor, lubricant and carbon black. The ethylene-propylene rubber component may include two ethylene-propylene rubbers having different Mooney viscosities. The inorganic filler can be talc or fine talc.

7 Claims, 1 Drawing Sheet

POLYPROPYLENE BUMPER COVER COMPOSITION

FIELD OF THE INVENTION

This invention relates to a polypropylene bumper cover composition, particularly to a polypropylene bumper cover composition with improved contraction rate, painting properties, and molding properties. The bumper cover composition of the invention includes ethylene-propylene rubbers having two different Mooney viscosities and inorganic filler.

BACKGROUND OF THE INVENTION

Presently, a polyurethane rim bumper of an automobile includes an applied bumper cover made of thermosetting resin. Accordingly, recycling of this material was impossible, and it had limited usefulness from an economical or environmental aspect. In order to solve this problem, polypropylene resin, of which recycling is possible and which has good molding properties and is light and inexpensive, was mixed with ethylene-propylene rubber. This composition had been used as a bumper cover. In use in this composition, ethylene-propylene rubber must be distributed in polypropylene resin, but as shown in FIG. 1(a), it was not distributed uniformly due to differences of thermal character between polypropylene and ethylene-propylene rubber at molding time. Therefore, the physical property of the molding product was inferior, its coefficient of linear expansion was enlarged, its contraction rate was unbalanced, and its painting properties were inferior. Accordingly, it had limitations for use as external large-sized products, such as bumpers.

In order to solve the above problem, Japanese Unexamined Patent No. 1-204946 disclosed a thermocontracting resin composition for an automobile bumper having the following characteristics: (a) 40~68 wt % of a propylene-ethylene block copolymer which contains 5~20 wt % of a boiling xylene soluble powder containing 20~60 wt % of ethylene, providing 1~10 wt % of ethylene in the whole polymer, the block copolymer having a melt flow rate of 15~120 g/10 min under a 2.16 kg load, (b) 12~32 wt % of an ethylene-propylene copolymer rubber having a Mooney viscosity $ML_{1+4}(100° C.)$ of 20~150, (c) 10~30 wt % of a copolymer, having a density of 0.89~0.92, which is obtained by copolymerizing ethylene and $\alpha$-olefin of $C_3$~$C_{12}$, and (d) 5~15 wt % of Talc with a mean droplet diameter of 0.5~2.5μ, a melt flow rate of 10 g/10 min or more, a bending elasticity of 6,000~9,000 kg/cm², a high speed face impact of 8 J or more, and a rate of molding contraction below $9 \times 10^{-3}$.

The material for the bumper described above has improved size stability, but its painting properties were not improved. Accordingly, the inventors have sought to overcome these defects of the prior art and have proposed: when polypropylene is mixed with ethylene-propylene rubber, flat and fibrous inorganic filler is added to it, therefore, providing a resin composition according to the invention having low linear expansion and ethylene-propylene rubber controlled Mooney viscosity, wherein the ethylene-propylene rubber is distributed uniformly in the polypropylene resin.

SUMMARY OF THE INVENTION

The object of this invention is to provide a polypropylene bumper cover composition with improved contraction rate, coefficient of linear expansion, painting properties, and molding properties. The bumper cover composition according to the invention contains polypropylene resin and ethylene-propylene rubber, providing a bumper cover composition comprising 55~70 wt % of polypropylene resin, 28~45 wt % of ethylene-propylene rubber, 2~5 wt % of inorganic filler, 1~2.5 wt % of high density polyethylene (HDPE), and 2.5~7 wt % of oxidation inhibitor, lubricant and carbon black.

BRIEF DESCRIPTION OF THE DRAWINGS

FIG. 1 shows scanning electronic micrographs for a surface of a molding product produced by mixing polypropylene resin with ethylene-propylene rubber.

DETAILED DESCRIPTION OF THE INVENTION

Figure 1A:
FIG. 1(a) is a photomicrograph of polypropylene with ethylene-propylene prepared by simple mixing.

This invention relates to a polypropylene bumper cover composition having good contraction rate, painting properties and molding properties, wherein the composition contains an inorganic filler.

In this composition, if the content of polypropylene is less than 55 wt %, it is difficult for the product to maintain its rigidity. If the content of polypropylene is more than 70 wt %, its painting properties and impact absorptive power is decreased.

In one embodiment of the invention, ethylene-propylene rubbers whose Mooney viscosities are 20R and 70R, respectively, are mixed in an approximate weight ratio of 1:1. This ethylene-propylene rubber mixture is contained in the amount of 28~45 wt % and distributed uniformly in the polypropylene resin. If the content of ethylene-propylene rubber is less than 28 wt %, the resulting product's painting properties are decreased, and if it is more than 45 wt %, its bending elasticity and molding properties are decreased.

Also, 2~5 wt % of inorganic filler is added to the bumper cover composition to introduce low linear expansion. Talc or fine talc can be used as filler, and flat and fibrous filler can be used in equal amounts. If the content of inorganic filler is less than 2 wt %, the resulting material has a problem maintaining its rigidity and low linear expansion, and if it is more than 5 wt %, its impact tolerance is decreased.

High density polyethylene (HDPE) plays a role as a low contractant, and additionally oxidation inhibitor, lubricant and carbon black also can be added to the composition of this invention. If the content of HDPE is less than 1 wt %, it cannot play a role as a low contractant, and if it is more than 2.5 wt %, the resulting material surface is not uniform.

IRGANOX 1010, IRGANOX 1076, TINUVIN 326 or UITRANOX 626 can be added as oxidation inhibitors, and calcium stearate can be used as a lubricant.

The composition of this invention can maintain a balance at molding and has an excellent contraction rate and coefficient of linear expansion. Accordingly, this material can be effectively and widely used in exterior parts of an automobile. Hereafter, this invention is described in more detail based upon the following examples, but the invention is not confined to the examples.

EXAMPLES 1~5, COMPARATIVE EXAMPLES 1~4

In accordance with the blending ratios shown in the following Table 1, polypropylene resin, ethylene-propylene rubber, inorganic filler, HDPE and the others were blended using a twin extrusion system to prepare a polypropylene bumper cover composition.

TABLE 1

|  |  | Example | | | | | Comparative | | | |
|---|---|---|---|---|---|---|---|---|---|---|
|  |  | 1 | 2 | 3 | 4 | 5 | 1 | 2 | 3 | 4 |
| PP resin[1] | | 60 | 55 | 58 | 65 | 67 | 75 | 75 | 50 | 50 |
| EPR[2] Mooney viscosity | 20 R | 17 | 18 | 17 | 15 | 14 | 20 | 23 | 46 | — |
|  | 70 R | 18 | 18 | 16 | 15 | 14 | — | — | — | 46 |
| Inorganic filler[3] | | 2 | 2.5 | 5 | 2 | 2 | 2 | — | — | — |
| HDPE[4] | | 1 | 2.5 | 1.5 | 1 | 1.5 | — | — | 2 | 2 |
| The others[5] | | 2 | 4 | 2.5 | 2 | 1.5 | 3 | 2 | 2 | 2 |

Notes:
[1] Polypropylene
[2] Ethylene-propylene rubber
[3] Talc
[4] High Density Polyethylene
[5] Examples 1 ~ 5: Oxidation inhibitor, lubricant and carbon black
Comparative Examples 1 ~ 4: Oxidation inhibitor and carbon black

EXPERIMENTAL EXAMPLE

Impact tolerance, bending elasticity, melt index, rate of contraction, coefficient of linear expansion and painting properties of the polypropylene bumper cover compositions prepared by the above Examples 1~5 and Comparative Examples 1~4 were measured.

The results are shown in the following Table 2.

Impact tolerance, bending elasticity, melt index and coefficient of linear expansion were measured by ASTM D3763, ASTM D790, ASTM D1238 and ASTM D696, respectively. Contraction rate was measured by comparing linear distance of a marking on the metal mold with the linear distance of the marking on the product over 24 hours after molding was completed.

TABLE 2

|  | Examples | | | | | Comparative Examples | | | |
|---|---|---|---|---|---|---|---|---|---|
|  | 1 | 2 | 3 | 4 | 5 | 1 | 2 | 3 | 4 |
| Impact tolerance (J) | 10.5 | 11.5 | 11.0 | 10.5 | 10.0 | 8.0 | 8.0 | 13.0 | 13.0 |
| Bending elasticity (kg/cm$^2$) | 6000 | 5800 | 5800 | 5900 | 6000 | 7500 | 7000 | 3800 | 3600 |
| MI (g/10 min) | 12 | 13 | 13 | 13 | 12 | 8 | 9 | 8 | 7 |
| Rate of contraction (cm/cm × 10$^{-3}$) | 10 | 9.8 | 10 | 9.5 | 10 | 13 | 14 | 9 | 8.8 |
| Coefficient of linear expansion (mm/mm/°C. × 10$^{-5}$) | 8.7 | 8.5 | 8.5 | 8.1 | 8.8 | 12 | 13 | 7.5 | 7.5 |
| Painting property | O | O | O | O | O | X | X | O | O |

Note:
O—good
X—bad

Figure 1B:
FIG. 1(b) is a photomicrograph of a polypropylene bumper cover composition prepared by Example 2 of this invention.

As shown in Table 2, the polypropylene bumper cover composition of this invention has good contraction rate, coefficient of linear expansion, and painting property compared to the Comparative Examples because ethylene-propylene rubbers whose Mooney viscosities are 20R and 70R, respectively, are used, and because inorganic filler is added. As shown in FIG. 1(b), its surface is uniform.

What is claimed is:

1. A bumper cover composition comprising: 55 to 70 wt % of a polypropylene resin, 28 to 45 wt % of an ethylene-propylene rubber component, 2 to 5 wt % of an inorganic filler, 1 to 2.5 wt % of a high density polyethylene, and 2.5 to 7 wt % of an oxidation inhibitor, a lubricant and carbon black.

2. The composition according to claim 1, wherein said ethylene-propylene rubber component includes a first ethylene-propylene rubber material having a Mooney viscosity of 20R and a second ethylene-propylene rubber material having a Mooney viscosity of 70R, wherein the weight ratio of the first ethylene-propylene rubber material to the second ethylene-propylene rubber material is about 1:1.

3. The composition according to claim 1, wherein said inorganic filler is talc or fine talc.

4. The composition according to claim 2, wherein said inorganic filler is talc or fine talc.

5. The composition according to claim 1, wherein said ethylene-propylene rubber component includes a first ethylene-propylene rubber material and a second ethylene-propylene rubber material, wherein the first ethylene-propylene rubber material and the second ethylene-propylene rubber material have different viscosities.

6. The composition according to claim 5, wherein the weight ratio of the first ethylene-propylene rubber material to the second ethylene-propylene rubber material is about 1:1.

7. The composition according to claim 5, wherein said inorganic filler is talc or fine talc.

* * * * *